UNITED STATES PATENT OFFICE.

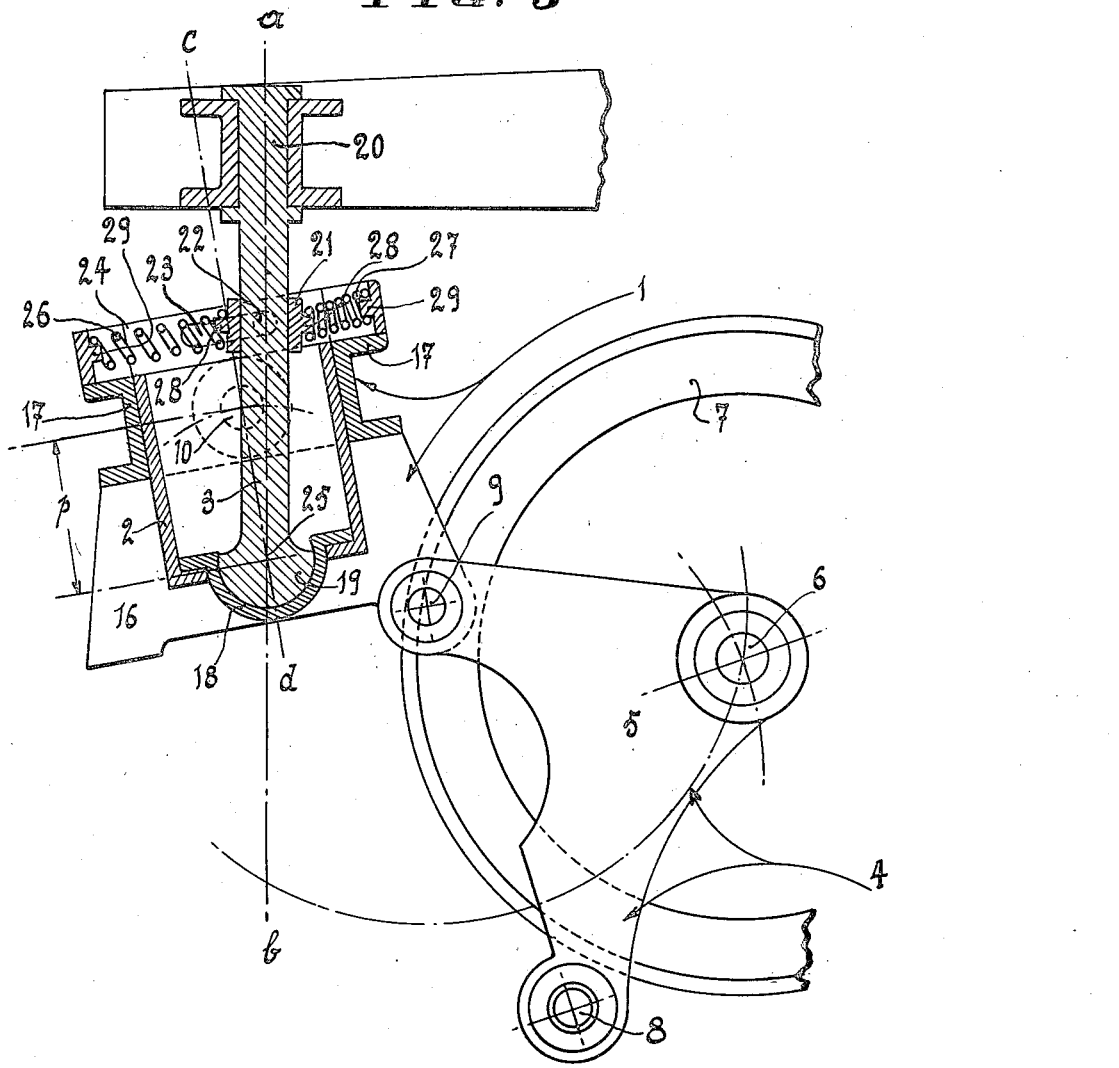

MARCEL LEYTENS, OF ANTWERP, BELGIUM.

MEANS FOR COUPLING TRACTORS AND TRAILERS.

1,416,217. Specification of Letters Patent. Patented May 16, 1922.

Application filed August 17, 1921. Serial No. 493,076.

(GRANTED UNDER THE PROVISIONS OF THE ACT OF MARCH 3, 1921, 41 STAT. L., 1313.)

*To all whom it may concern:*

Be it known that I, MARCEL LEYTENS, a subject of the King of the Belgians, residing at Mortsel-lez-Antwerp, Belgium, Chaussée de Deurne 176, have invented certain Means for Coupling Tractors and Trailers, (for which I have filed application in Belgium September 14, 1917, No. 277,101, and France February 27, 1914, No. 469,003, with addition January 19, 1920, Patent No. 22,703, and Germany February 25, 1914, No. 322,921, with addition June 22, 1920, not yet granted, and England June 24, 1919, Patent No. 145,260,) of which the following is a specification.

The present invention relates to improved means for coupling a motor tractor and trailer, and essentially consists in a construction and arrangement of frame for a tractor and of fore-part for a trailer specially designed to allow the rapid automatic and rational coupling of the two vehicles. One of the main features of the invention is that the rear-part of the frame of the tractor is adapted to receive and support, when the vehicles are coupled, the fore-part of the trailer, the said fore-part being constructed in such a manner that the wheels which normally (that is to say when the trailer is not coupled) support same are automatically raised during the process of coupling through the engagement of a movable part of the fore-part of the trailer with the suitably shaped back-part of the frame of the tractor, so that after coupling the two vehicles for a combination with 3 pairs of wheels, the front-wheels of the trailer being then replaced in their function by the rear-wheels of the tractor, and further the frame of the tractor and the fore-part of the trailer are adapted to form when coupled such a combination that the points of support of the fore-part of the trailer on the back part of the frame of the tractor and also the point of pivotment of the trailer relatively to the said combination of the frame of the tractor with the fore-part of the trailer rendered integral with the said frame, are both situated in the vertical plane passing through the axis of the axle of the rear- or driving-wheels of the tractor.

When two vehicles are coupled together, according to the present invention, the wheel base of the combination is considerably shortened as compared with a wholly independent tractor and trailer of any existing type coupled together by any of the previously known means. Besides, when the load has arrived at its destination and the tractor is required elsewhere, the truck according to the present invention may be used for animal traction and thus remains a useful vehicle until again coupled with a tractor suitable for the purpose.

The present invention also comprises the combination with the fore-part of the trailer of a pivot carrying the front-end of the trailer-frame supported by the said fore-part through a ball- and socket arrangement, and of a device tending to maintain the pivot and the part of the fore-part of the trailer which supports same in the required position in relation to one another while allowing their relative movement within limits under the influence of the shocks caused through sudden starting, stopping or braking of the tractor, the said shocks being consequently absorbed so that they are not transmitted to the frame of the trailer.

An embodiment of the invention is, by way of example only, illustrated by the accompanying drawings in which:

Fig. 5 is an enlarged vertical section through the longitudinal axis of the trailer, showing in detail the fore-part of the latter and connected parts, the said fore-part being shown in the position taken in relation to the ball-ended or like pivot under the influence of a shock when the two vehicles are coupled.

Figure 1:
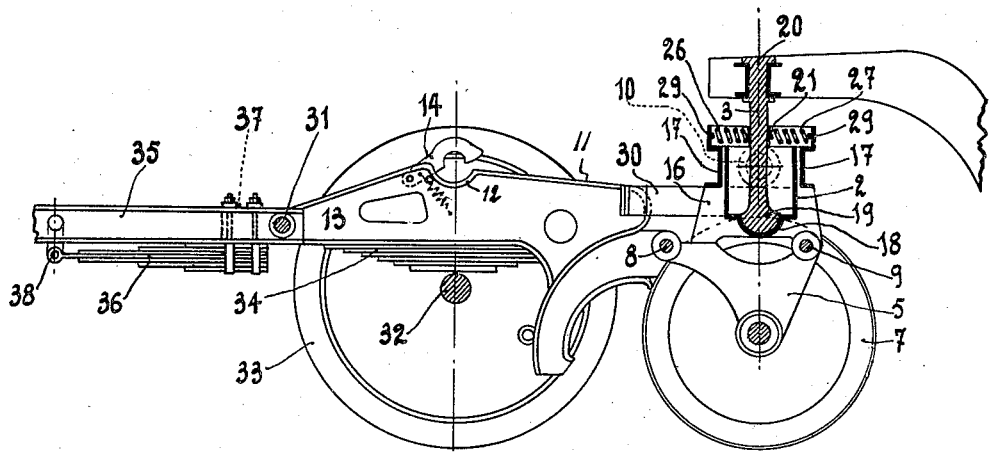
Fig. 1 is a longitudinal side-elevation of the rear-part of the frame of the tractor and of the front-part of the trailer before coupling.
Figure 2:
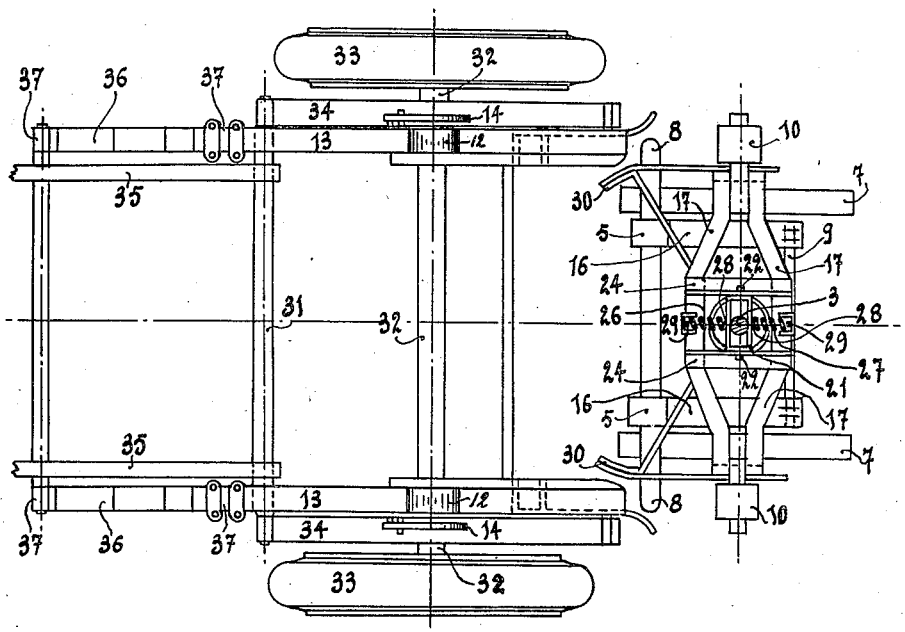
Fig. 2 is a plan view of the combination according to Fig. 1.

As may be seen from Figs. 1 and 2 of the drawings, the frame of the tractor is formed of two parts, which are connected by means of a transverse bar 31. The front part of the said frame is supported in the usual manner, while the rear-part is supported by the axle 32 of the rear- or driving wheels 33 through the medium of two semi-elliptic blade springs 34, which take up the load and are secured in any known or suitable manner to the axle 32 and to the longitudinal members 13 of the rear-part of the tractor. The rear-members of the frame of the tractor have a special shape to allow the ends of a bar fixed at the front of the swivelling part of the fore-part of the trailer to engage themselves in curved-guideways with which the said members are provided in order to cause the raising of the front-wheels of the trailer when the two vehicles are being connected, in the manner explained hereunder. The front-end of the members 13 and the rear-end of the longitudinal members 35 forming the front-part of the frame are both pivotally mounted on and connected by the transverse bar 31. The front members 35 and the rear members 13 of the frame are thus able to move in relation to each other about the transverse rod 31, and blade springs 36 are rigidly fixed on the one hand to an extension 37 of the front end of the members 13 to the fore of the transverse rod 31, and on the other hand to the longitudinal member 35 of the front part of the frame at the point 38. The function of the springs 36 is to maintain the front members 35 and the rear members 13 of the frame of the tractor aligned and to absorb the shocks imparted to the rear-part, especially when the latter is not loaded and consequently more sensitive to shocks. Indeed, under the influence of the reaction due to starting, stopping or braking, the bar 31 connecting the front and rear members tends to effect a circular movement and describe a curve having for its centre the centre of the axle 32 of the rear wheels of the tractor and owing to which the front and rear members tend to come out of alignment in relation to each other, which tends to cause the springs 36 to flex, but as the said springs oppose said movement, they maintain the two parts of the frame of the tractor in the required relative position.

Figure 3:
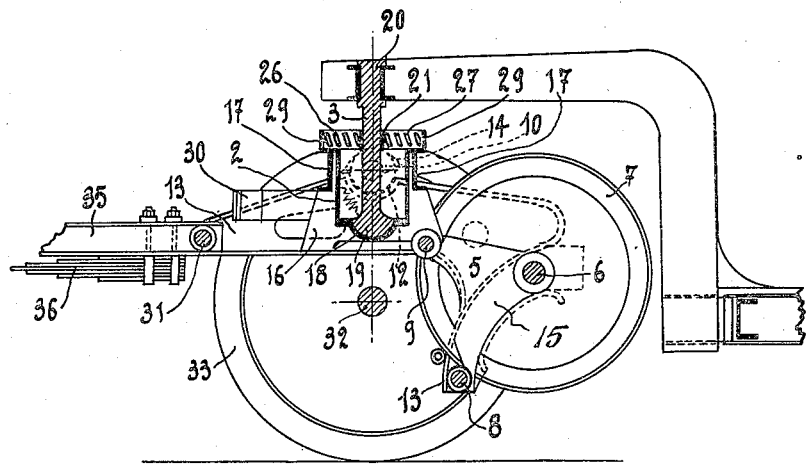
Fig. 3 is a vertical section through the longitudinal axis of the vehicles showing the rear-part of the frame of tractor and the front-part of the trailer in the position taken by those parts when the two vehicles are coupled.
Figure 4:
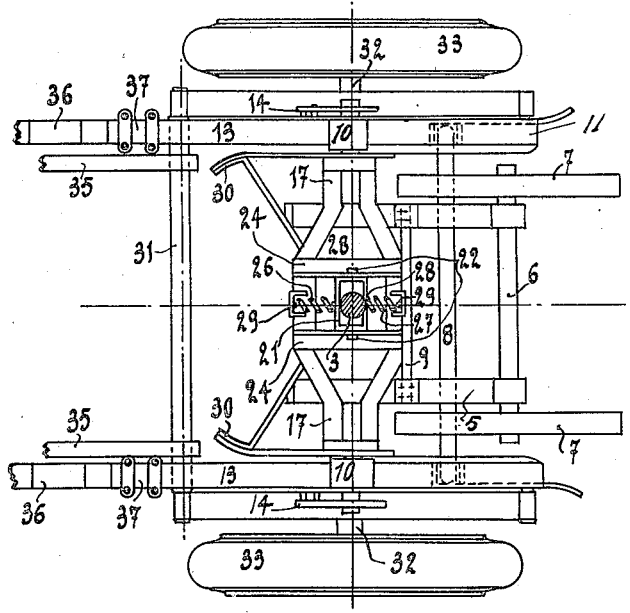
Fig. 4 is a plan view of the combination according to Fig. 3.

Referring to Figures 3 and 4 of the drawings, the fore-part of the trailer is composed of an upper part 1 comprising a casing 2 which encloses the pivot 3 by means of which the front-end of the frame of the trailer is supported, and of a lower swivelling part 4 which, in the position of the fore-part of the trailer when the latter is not coupled with the tractor supports the upper-part 1 of the said fore-part and consequently the front-end of the frame of the trailer. This swivelling lower-part of the fore-part of the trailer comprises two lateral plates 5 which carry at their lower end the axle 6 on which are mounted the front-wheels 7 of the trailer. At their upper front end the plates 5 are connected and kept at the proper spacing by a transverse bar 8 of which the ends are extended or project outwards of a certain distance beyond the plates 5. The latter are at their upper rear end mounted on a transverse bar 9 which is carried by the corresponding part of the upper part 1 of the fore-part of the trailer and acts as a pivot to allow the lower part 4 to swivel bodily from the position shown in Fig. 1, wherein the wheels 7 carry the front end of the trailer to the position shown in Fig. 3, wherein, as will be explained hereunder the wheels 7, being raised, cease to carry the front-end of the trailer and are replaced for this function by the rear-wheels of the tractor. Indeed, the upper part 1 of the fore-part of the trailer, of which a description will be given hereunder, is, on either side, provided with a lateral roller; when the tractor is moved towards the trailer, the rollers 10 of the upper part of the fore-part of the trailer run up inclines 11 forming the upper faces of the rear part of the suitable members of the frame of the tractor and finally come to a stop in hollow seats 12 provided for the purpose in a suitable position on the upper face of the rear-members 13 of the frame of the tractors and where they are maintained as long as the two vehicles remain coupled, by means of any suitable device, such as for instance hook-catches or latches 14, while simultaneously the outer ends of the transverse bar 8 engage the guideways 15 curved in a forward and downward direction and formed by the lower rear part of the members 13 of the frame of the tractor so that the ends of the bar 8 are thus made to describe a curve somewhat similar to a quarter of a circumference and to cause the lower pivoted part 4 of the fore-part of the trailer to swivel about the pivot-bar 9 so as to bring it to the position shown in Fig. 3, with the wheels 7 raised. In the said position, the front-end of the trailer, instead of being carried by the wheels 7, is therefore supported through the medium of the rollers 10, on the rear-part of the tractor, and as the hollow seats 12 are situated in the vertical plane passing through the longitudinal axis of the axle of the rear-wheels of the tractor, the said rear wheels of the tractor then take the place of the front-wheels of the trailer and fulfil their task. The upper-part of the fore-part of the trailer comprises two plates carrying the pivot-bar 9 and a casing 2 for the pivot 3 which supports the front-end of the frame of the trailer, the whole being secured together by means of two channel-irons 17 arranged transversely and to the ends of which the rollers 10 are, in the embodiment illustrated, fixed. The central portion of the channel-irons 17 is shaped so as to leave between them a suitable space for the casing 2 which they carry and of which the bottom forms a suitable semi-spherical seating to receive semi-spherical or equivalent lower end 19 of the pivot 3, which has its upper end rigidly fixed at 20 to the front-end of the frame of the trolley. The fore-part of the trailer is constructed and arranged in such a manner as to be able to oscillate in relation to the pivot 3, both longitudinally and laterally in relation to the longitudinal axis of the coupled vehicles (see also Fig. 5). For the purpose, the pivot 3 passes freely through a guide 21 of which the ends are provided with lateral trunnions 22 able to slide in suitable slots 23 provided in the vertical flanges of two members formed by angle-irons 24 secured on the channel irons 19 at a suitable spacing to be guided in their sliding movement by the trunnions 22 of the guide 21, in the longitudinal direction. The guide 21 having a laterally elongated shape, it will be readily understood that the said guide is able to move laterally in relation to the pivot 3, thus allowing the lateral oscillation of the casing 2, and consequently of the whole fore-part of the trailer, about the centre 25 of the spherical portion forming the lower end of the pivot 3, while the movement, guided owing to the slide 23, of the angle-irons 24 and the channel-irons 17, together with the parts integral therewith in relation to the guide 21, combined with the movement of the said guide 21 along the pivot 3 rendered necessary by the inclination of the angle irons 24 (see more particularly Fig. 5), allows the longitudinal oscillation of the casing 2 and the corresponding parts of the fore-parts of the trailer about the centre 25 of the spherical end 19 of the fixed pivot 3. As the traction is, owing to the arrangement explained above, transmitted from the tractor to the trailer through the medium of the rollers 10 integral with the part of the fore-part of the trailer which is able to oscillate about the centre 25 of the spherical portion 19 of the pivot 3, when an effort due to sudden traction or braking takes place, the said rollers 10, as shown in Fig. 5, tend to move away from the normal position (see Fig. 3) wherein their centres coincide with the vertical plane passing through the vertical axis of the pivot 3, and thus tend to involve the casing 2 and the corresponding parts of the trailer in a movement of oscillation about the centre 25 of the spherical end 19 of the pivot 3, which results in the centre of the said rollers describing a curve which has for its centre the centre 25 of the spherical portion 19 of the pivot 3 and for radius the distance $p$ between this centre and the centre of the rollers 10, and in the vertical axis of the fore-part of the trailer taking a position such for instance as that of the axis $c$—$d$ in Fig. 5, inclined in relation to the normal vertical axis $a$—$b$ (Fig. 5), which is the vertical axis of the pivot 3. In order to prevent the frame of the trailer from being subjected to these shocks caused by sudden starting stopping or braking and to some extent to the irregularities in the surface of the road, the present invention also comprises a shock-absorbing device for such shocks, the said device consisting mainly in an arrangement of springs which tend resiliently to counteract the oscillation of the fore-part of the trailer in relation to the pivot 3 and to maintain the said fore-part in the position wherein its vertical axis coincides with the axis $a$—$b$ of the pivot 3. In the arrangement illustrated, two shock-absorbing springs are provided, one 26 being placed in front of the pivot 3, and the other, 27, being positioned at the rear of the said pivot. The ends of the springs 26 and 27, adjacent the pivot 3 bear against suitable seatings 28 cast on the guide 21, while their ends opposed to the pivot 3 bear against suitable abutments 29 formed or fixed centrally on the upper flange of the channel-irons 17. It is obvious that these springs 26 and 27 constitute efficient means for absorbing the shocks caused by sudden starting, stopping or braking, which shocks are absorbed before making their influence felt on the pivot 3 and consequently on the frame of the trailer, and in this manner it is possible to obtain a soft and resilient traction. Moreover, the said springs 26 and 27 act not only as shock-absorbers, but they also normally tend to maintain the fore-part of the trailer in the position wherein the plane passing through its central vertical axis coincides with the vertical axis of the pivot 3, and consequently tend to maintain the centre of the axle 6 of the wheels 7 in the plane of the said vertical axis of the pivot 3 when the said wheels 7 are in the normal or lowered position, in which position they support the front end of the frame of the trailer.

Of course, the manner in which the springs 26 and 27 are secured may vary, and it is obvious that any spherical ball and socket arrangement or the like may be employed instead of the spherical end pivot and its seat without the principle of the invention being affected thereby, the principle of this part of the invention consisting in combining a shock-absorbing device and an arrangement of the fore-part of the trailer and the corresponding parts allowing and limiting the necessary guided oscillatory movement of the said fore-part and the front-wheels of the trailer in relation to the fixed pivot and to the frame of the trailer supported thereby, the said pivot constituting at the same time both the point of traction and the point of connection for the trailer. Any suitable device, such as flat-bars 30 fixed laterally in any suitable or known manner to the upper part 1 of the fore-part of the trailer may be employed to guide the said fore-part of the trailer as it becomes engaged between the two rear members 13 of the frame of the tractor during the coupling of the two vehicles.

It will be observed that the coupling is effected in an entirely automatic manner without the driver having to leave his seat and without any assistant being necessary, simply by causing the tractor to move backwards towards the trailer so that the fore-part of the latter enters between the two longitudinal members of the rear-part of the frame of the tractor.

It must be expressly understood that neither the principle nor the scope of the invention are in any way limited by or restricted to the details of structural features or of the arrangement of part illustrated by the accompanying drawings.

I claim:

1. Improved means for coupling a motor tractor and a trailer, comprising an arrangement of tractor frame adapted to cooperate with the fore-part of the trailer when the two vehicles are being coupled, and characterized by the fact that it comprises: two sections composed respectively of a pair of rear longitudinal members and of a pair of front longitudinal members and having their corresponding ends pivotally connected by means of a transverse bar, in combination with a pair of blade springs fixed on the one hand to an extension of the front end of the rear longitudinal members to the fore of the transverse bar and on the other hand to a suitable point of the front longitudinal members in such a manner as to maintain the two sections of the frame of the tractor in alignment in relation to one another, the rear members of the frame of the tractor being adapted to receive between them and to support the fore-part of the trailer when the two vehicles are coupled and provided with curved guideways adapted to engage with the two ends of a transverse rod integral with a swivelling part of the fore-part of the trailer so as to cause automatically the raising of the front wheels of the trailer when the two vehicles are moved towards each other during the process of coupling and the rear-wheels of the tractor replace in their function the front-wheels of the trailer, substantially as described.

2. Improved means for coupling a motor tractor and a trailer, comprising an arrangement of trailer fore-part adapted to cooperate with the rear portion of the tractor-frame when the two vehicles are being coupled, and characterized by the combination: of a part capable of a limited swivelling movement relatively to a fixed pivot situated in the vertical plane of the axis of the axle of the front-wheels of the trailer and supporting the front end of the frame of the latter, and provided with lateral rollers situated in the transverse plane of the vertical axis of the aforesaid pivot and adapted to run-up, when the two vehicles are moved towards each other during the process of coupling, inclines formed by the rear part of suitably arranged longitudinal members of the tractor-frame and to come to a stop in hollow seats of the said members of the tractor in such a manner that their centre, and consequently the vertical axis of the pivot and the points of support of the fore-part of the trailer on the rear-part of the tractor-frame, is situated in the vertical plane of the longitudinal axis of the axle of the rear-wheels of the tractor; and of a lower part carrying the axle of the front-wheels of the trailer able to pivot in relation to the upper-part of the fore-part of the trailer and connected at its upper rear end by means of a transverse pivot-bar to the said upper-part, and which is at its upper front end provided with a transverse bar adapted to become engaged, during the process of coupling, in curved guideways formed by the lower rear portion of the aforesaid longitudinal rear members of the tractor-frame in such a manner as to cause the movable lower part of the fore-part of the trailer to pivot relatively to the upper part of the said fore-part and thus to move the said movable lower part with the front wheels of the trailer from the normal position, in which the said wheels are on the road and support the front end of the trailer frame through the medium of the aforesaid movable lower part of the fore-part of the trailer, to a position in which the said wheels, having been raised during the process of coupling, cease to support the front end of the trailer, which is then supported by the rear section of the tractor-frame through the medium of the aforementioned lateral rollers, substantially as described.

3. Improved means for coupling a motor-tractor and a trailer as claimed in claim 2, further characterized by the fact that they comprise as a means for the support of the front-end of the trailer-frame by the fore-part of the said trailer a pivot supported by the bottom of a casing integral with the upper-part of the said fore-part of the trailer through the medium of a spherical ball-and-socket or like arrangement, in such a manner as to allow a limited oscillation of the said casing and the corresponding parts of the fore-part of the trailer in relation to the said pivot in both directions, the said oscillation taking place, in the direction of the longitudinal axis of the vehicles, against the action of springs arranged in such a manner as to tend to maintain the fore-part of the trailer in the normal position in which its vertical axis coincides with that of the aforesaid pivot, and acting consequently to absorb the shocks caused by sudden starting, stopping or braking which tend to cause the aforesaid fore-part of the trailer to oscillate, substantially as described.

4. Improved means for coupling a motor tractor and a trailer, as claimed in claim 3, further characterized by the fact that the shock-absorbing-device combined with the fore-part of the trailer and its pivot comprises: two longitudinal members fixed to the upper side of the part of the said fore-part of the trailer which supports the fixed pivot and provided with longitudinal slots allowing the said members to slide in relation to the trunnion like ends of a guide through which the pivot passes freely and which is able to move along the said pivot so as to guide their oscillation and consequently the oscillation of the whole of the fore-part of the trailer in the direction of the longitudinal axis of the vehicles about the centre of the ball or like end of the pivot supported on the seat formed by the bottom of the casing integral with the upper-part of the fore-part of the trailer; and two spiral springs positioned respectively in front and at the rear of the pivot between the aforesaid guide and suitable abutments provided on the central portion of the upper flange of the transverse members of the upper part of the aforesaid fore-part of the trailer, and arranged in such a manner as to tend to counteract the aforesaid oscillation and to maintain the said fore-part of the trailer in the position in which its vertical axis coincides with that of the aforesaid pivot, the said springs being consequently adapted to act to absorb the shocks caused by sudden starting, stopping or braking which tend to cause the fore-part of the trailer to oscillate in relation to its pivot in the direction of the longitudinal axis of the vehicles, substantially as described.

5. Improved means for coupling a motor tractor and a trailer, as claimed in claim 4, further characterized by the fact that the guide through which the pivot passes freely has a shape elongated transversely in relation to the longitudinal axis of the trailer, so as to allow a limited transverse movement of the said guide in relation to the pivot and consequently a limited oscillation of the fore-part of the trailer about the centre of the semi-spherical or like end of the pivot transversely in relation to the longitudinal axis of the vehicles, substantially as described.

In testimony thereof I signed hereunto my name.

M. LEYTENS.